United States Patent
Ye et al.

(10) Patent No.: US 10,038,537 B2
(45) Date of Patent: Jul. 31, 2018

(54) COMMON SEARCH SPACE IN SECONDARY ENBS

(71) Applicants: Alcatel-Lucent USA Inc., Murray Hill, NJ (US); Alcatel Lucent, Boulogne-Billancourt (FR)

(72) Inventors: Sigen Ye, Whitehouse Station, NJ (US); Matthew P J Baker, Canterbury (GB)

(73) Assignees: Alcatel Lucent, Boulogne-Billancourt (FR); Nokia of America Corporation, Murray Hill, NJ (US)

( * ) Notice: Subject to any disclaimer, the term of this patent is extended or adjusted under 35 U.S.C. 154(b) by 71 days.

(21) Appl. No.: 14/617,873

(22) Filed: Feb. 9, 2015

(65) Prior Publication Data

US 2015/0230215 A1    Aug. 13, 2015

Related U.S. Application Data

(60) Provisional application No. 61/937,599, filed on Feb. 9, 2014.

(51) Int. Cl.
| | |
|---|---|
| *H04W 4/00* | (2018.01) |
| *H04L 5/00* | (2006.01) |
| *H04W 48/16* | (2009.01) |

(52) U.S. Cl.
CPC .......... *H04L 5/0053* (2013.01); *H04L 5/001* (2013.01); *H04L 5/0035* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2014/0192740 A1* | 7/2014 | Ekpenyong | ........... H04L 5/0035 370/329 |
| 2014/0286243 A1* | 9/2014 | Yamada | .............. H04W 76/025 370/329 |
| 2014/0286305 A1* | 9/2014 | Yamada | .............. H04W 36/165 370/331 |

(Continued)

OTHER PUBLICATIONS

RP-132069, "New Work Item Description: Dual Connectivity for LTE," NTT Docomo, Inc., NEC Corporation, RAN #62, Busan, Korea, Dec. 2013, available online as "RP-132-69 WID DC Core part clean" at http://www.3gpp.org/ftp/tsg_ran/tsg_ran/TSGR_62/Docs/RP-132069.zip, 6 pgs.

(Continued)

*Primary Examiner* — Anh-Vu Ly
(74) *Attorney, Agent, or Firm* — Parker Justiss, PC

(57) ABSTRACT

A method is provided for receiving, at a receiving device, a control information message from a transmitting device. An example method includes determining at a user equipment (UE) a status of the UE and monitoring at the UE based on the status either a common search space (CSS) of a cell or a UE-specific search space (USS) of the cell. The cell is a cell of a secondary eNodeB for communicating with the UE. The method may further include monitoring a CSS and a USS of a cell of a master eNodeB (MeNB) simultaneously while monitoring either the CSS or the USS of the cell of the secondary eNodeB. The status may be a status of the UE with respect to a Random Access Channel (RACH) procedure with the cell.

10 Claims, 3 Drawing Sheets

200

(56) References Cited

U.S. PATENT DOCUMENTS

| | | | | |
|---|---|---|---|---|
| 2015/0131605 | A1* | 5/2015 | Nogami | H04L 5/0053 370/330 |
| 2015/0282134 | A1* | 10/2015 | Suzuki | H04L 5/0044 370/329 |
| 2015/0351119 | A1* | 12/2015 | Song | H04W 72/1268 370/329 |
| 2016/0119900 | A1* | 4/2016 | You | H04L 5/0094 370/336 |
| 2016/0135145 | A1* | 5/2016 | Tirronen | H04W 72/042 370/336 |
| 2016/0183203 | A1* | 6/2016 | Larsson | H04W 52/346 370/329 |
| 2016/0183323 | A1* | 6/2016 | Rahman | H04W 74/0833 370/329 |
| 2016/0219595 | A1* | 7/2016 | Larsson | H04L 5/001 370/329 |
| 2017/0181137 | A1* | 6/2017 | Yang | H04W 72/042 370/329 |
| 2017/0339683 | A1* | 11/2017 | Chen | H04W 52/0209 370/329 |

OTHER PUBLICATIONS

RP-132069, 3GPP Work Item Description, "Dual Connectivity for LTE", available online as "RP-132-69 WID DC Core part with history" at http://www.3gpp.org/ftp/tsg_ran/tsg_ran/TSGR_62/Docs/RP-132069.zip, Dec. 3-6, 2013, 6 pgs.

RP-132069, 3GPP Work Item Description, "Dual Connectivity for LTE", available online as "RP-132-69 WID DC Feature part clean" at http://www.3gpp.org/ftp/tsg_ran/tsg_ran/TSGR_62/Docs/RP-132069.zip, Dec. 3-6, 2013, 6 pgs.

RP-132069, 3GPP Work Item Description, "Dual Connectivity for LTE", available online as "RP-132-69 WID DC Feature part with History" at http://www.3gpp.org/ftp/tsg_ran/tsg_ran/TSGR_62/Docs/RP-132069.zip, Dec. 3-6, 2013, 6 pgs.

RP-132069, 3GPP Work Item Description, "Dual Connectivity for LTE", available online as "RP-132-69 WID DC Performance part" at http://www.3gpp.org/ftp/tsg_ran/tsg_ran/TSGR_62/Docs/RP-132069.zip, Dec. 3-6, 2013, 4 pgs.

* cited by examiner

| DCI format | RNTI |
|---|---|
| DCI format IC/1A | SI-RNTI |
| DCI format IC/1A | P-RNTI |
| DCI format IC/1A | RA-RNTI |
| 0 | Temporary C-RNTI |
| 0/1A | C-RNTI |
| 0/1A | SPS C-RNTI |
| 3/3A | TPC-PUCCH-RNTI |
| 3/3A | TPC-PUSCH-RNTI |

*FIG. 1A*

| DCI formats | RNTI |
|---|---|
| DCI format IC/1A | RA-RNTI |
| 0 | Temporary C-RNTI |
| [3/3A (FFS) | TPC-PUCCH-RNTI] |
| [3/3A (FFS) | TPC-PUSCH-RNTI] |

*FIG. 1B*

COMMON SEARCH SPACE IN SECONDARY ENBS

CROSS REFERENCE TO RELATED APPLICATIONS

This application claims priority to U.S. Provisional Patent Application 61/937,599 filed on Feb. 9, 2014, which is incorporated by reference herein in its entirety.

FIELD

This invention relates generally to communication systems, and, more particularly, to wireless communication systems and the monitoring of search spaces thereof.

DESCRIPTION OF THE RELATED ART

In 3rd Generation Partnership Project (3GPP) Radio Access Network (RAN) #62, a work item on dual connectivity for Long Term Evolution (LTE) networks was approved [See RP-132069, "New Work Item Description: Dual Connectivity for LTE," NTT DOCOMO, INC., NEC Corporation, RAN#62, December 2013]. With dual connectivity, a given multiple Receiver/Transmitter User Equipment (Rx/Tx UE) in a Radio Resource Control connected state (e.g., RRC_CONNECTED) can be configured to utilize radio resources provided by two distinct schedulers, one scheduler located in a Master eNB (MeNB) and a second scheduler located in a Secondary eNB (SeNB). The Master eNB (MeNB) terminates at least S1-MME (Mobility Management Entity) interface and therefore acts as mobility anchor towards the core network. An eNB connects to the Mobility Management Entity (MME) by means of the S1-MME interface as is know in the art. The Secondary eNB (SeNB) provides additional radio resources for the UE. The SeNB is designed to support non-ideal backhaul between MeNB and SeNB, thus no tight coordination should be enforced between the two. The following agreements have been reached in RAN2 for dual connectivity:

At least one cell in the SeNB has configured an Uplink (UL) and one of them is configured with Physical Uplink Control Channel (PUCCH) resources.

Contention-based random access (RA) is supported for the SeNB.

UE receives Message 2 (Msg2) of RA from the eNB to which the preamble was sent.

Currently, a UE is only connected to a single eNB and monitors common search space (CSS) on the primary cell only in this eNB. A UE monitors multiple candidates on the CSS, which is also referred to as blind decoding. The number of candidates that a UE needs to monitor is called the number of blind decodings. Blind decoding depends on the size of the message. Currently, a UE connected to a single eNB is required to monitor the CSS for two (2) different message sizes, with six (6) candidates for each size, thus requiring twelve (12) blind decodings to monitor the CSS. At the same time, the UE also monitors the UE-specific search space (USS) for two (2) different message sizes, with sixteen (16) candidates for each size, thus requiring thirty-two blind decodings to monitor the USS for each serving cell. To support the agreements for dual connectivity, it is necessary for the UE to monitor CSSs on both MeNB and SeNB, respectively.

SUMMARY

Accordingly, an issue arises as to how to design the CSS on the SeNB. Since the CSS on the SeNB is a new concept, there is no existing solution for this issue. A straightforward approach would be to reuse the existing CSS design, having the UE monitor the same Downlink Control Information (DCI) formats and the same Radio Network Temporary Identifiers (RNTIs) as the existing primary cell CSS. A conventional UE monitors on the primary cell CSS for items including:

DCI format 1A/1C scrambled by SI-RNTI (System Information RNTI);

DCI format 1A/1C scrambled by P-RNTI (Paging RNTI);

DCI format 1A/1C scrambled by RA-RNTI (Random Access RNTI);

DCI format 0 scrambled by temporary C-RNTI (Cell RNTI);

DCI format 0/1A scrambled by C-RNTI;

DCI format 0/1A scrambled by SPS C-RNTI (Semi Persistence Scheduling C-RNTI); and DCI format 3/3A scrambled by TPC-PUCCH-RNTI or TPC-PUSCH-RNTI (Transmit Power Control-PUCCH-RNTI or TPC-Physical Uplink Shared Channel-RNTI).

The drawback of supporting all these functions in SeNB CSS is that the UE would need to monitor all these formats and the maximum number of blind decodings for the UE would be increased by twelve (12), which increases UE complexity.

Therefore, proposed and described herein are methods and apparatuses directed to the implementation of a CSS design that allows a UE to monitor either the CSS or the USS at any time, which does not require additional increase in the maximum number of blind decodings. These embodiments serve to reduce UE complexity.

One example of such a design is to have CSS on SeNB support the Random Access Channel (RACH) procedure only. The random-access channel (RACH) procedure is a communication mechanism used by mobile phones and other wireless devices on a Time Division Multiple Access (TDMA) network. The RACH procedure is used to get the attention of a base station (e.g., eNB) in order to initially synchronize the wireless device's transmission with the base station. A RACH is a shared channel that is used by wireless access terminals to access the access network. To be more specific, in this example, the UE monitors the CSS for:

DCI format 1A/1C scrambled by RA-RNTI; and

DCI format 0 scrambled by temporary C-RNTI.

All the other functions that are supported by the CSS on the primary cell either can be realized through other ways (e.g., delivered via MeNB), or are not necessary on SeNB. The proposed arrangement minimizes the number of formats/radio network temporary identifiers (RNTIs) the UE needs to monitor, which saves UE processing and UE power.

When the UE is monitoring the CSS during the RACH procedure, the UE does not need to monitor the UE-specific search space (USS). On the other hand, when the UE is not in a RACH procedure, the UE does not need to monitor CSS at all, and it only needs to monitor the USS. This means that the UE monitors either CSS or USS, but not both, at any time. Therefore the number of blind decodings needed is either twelve (12) (when the UE is monitoring CSS) or thirty-two (32) (when the UE is monitoring USS). The proposed arrangement does not require an increase of maximum number of blind decodes compared to a total of thirty-two (32) supported on secondary cell today. It also significantly reduces the number of formats/RNTIs and the time instances that a UE needs monitor the CSS.

In one embodiment, the UE monitors CSS only, without monitoring USS, during the RACH procedure. The UE may monitor for DCI format 1A/1C scrambled by RA-RNTI and DCI format 0 scrambled by temporary C-RNTI.

In another embodiment, the UE monitors USS only, without monitoring CSS, when it is not in a RACH procedure.

In one embodiment, the UE also monitors for the CSS and the USS for the MeNB. That is; the UE acts in the conventional manner with respect to monitoring the CSS and the USS of the MeNB while acting as described above with respect to the SeNB. Accordingly, in one embodiment, a UE monitors a CSS and a USS of a cell of a master eNodeB simultaneously while monitoring either the CSS or the USS of the cell of the secondary eNodeB. By simultaneously is meant at least one of for a same time period, for a same timeframe, within a same subframe or within a set of subframes.

The embodiments described herein allow a UE to minimize the instances and the number of formats/RNTIs that the UE needs to monitor and to not increase the maximum number of blind decodings, thus minimizing complexity impact, while supporting CSS on SeNB.

Another example embodiment, employs a time sharing between the monitoring of USS and the monitoring of CSS. The UE monitors CSS in some subframes and monitors USS in the remaining subframes. This embodiment also does not require an increase in the maximum number of blind decodings. When the UE should monitor the CSS or the USS can be defined in specifications, or signalled via higher layer signaling.

Note that in the proposed design, the CSS could have either the full functionality (same as primary CSS), or a reduced set of functionality. For example, in one embodiment, when the UE monitors the CSS, without monitoring the USS, the UE may monitor for only the DCI format 1A/1C scrambled by RA-RNTI and DCI format 0 scrambled by temporary C-RNTI.

Accordingly, in one embodiment, a method includes determining at a user equipment (UE) a status of the UE and monitoring at the UE based on the status either a common search space (CSS) of a cell or a UE-specific search space (USS) of the cell.

In one embodiment, the cell is a cell of a secondary eNodeB for communicating with the UE. In one embodiment, the monitoring at the UE based on the status either the CSS of the cell or the USS of the cell monitors a cell of a secondary eNodeB and the method also includes monitoring a CSS and a USS of a cell of a master eNodeB simultaneously while monitoring either the CSS or the USS of the cell of the secondary eNodeB.

In one embodiment, the status is a status of the UE with respect to a RACH procedure with the cell, and the cell is a cell of a secondary eNodeB. In one embodiment, the status indicates a time within a first set of subframes received by the UE or within a second set of subframes received by the UE.

In one embodiment, the status is indicative of a time at the UE within a CSS search time or a USS search time according to a time-sharing schedule.

In another embodiment, a method includes monitoring at a UE either a common search space (CSS) of cell or a UE-specific search space (USS) of the cell on a time-sharing basis.

In one embodiment, a method includes determining at a user equipment (UE) a status of the UE with respect to a RACH procedure with a cell of a secondary eNodeb and monitoring at the UE based on the status either a common search space (CSS) of the cell or a UE-specific search space (USS) of the cell.

In one embodiment, a method includes determining at a user equipment (UE) a status of the UE with respect to a RACH procedure, monitoring at the UE only one of a common search space (CSS) of the cell or a UE-specific search space (USS) of the cell based on the status.

In one embodiment, the monitoring of the method includes monitoring the common search space (CSS) during the RACH procedure.

In one embodiment, the monitoring of the method includes monitoring the common search space (CSS) when the status indicates the UE is engaged in the RACH procedure.

In one embodiment, the monitoring of the method includes monitoring the CSS for at least one of DCI format 1A/1C scrambled by RA-RNTI and DCI format 0 scrambled by temporary C-RNTI.

In one embodiment, the monitoring of the method includes monitoring the common search space (CSS) when the status indicates the UE is engaged in the RACH procedure.

In one embodiment, the monitoring of the method includes monitoring the CSS for only DCI format 1A/1C scrambled by RA-RNTI and DCI format 0 scrambled by temporary C-RNTI.

In one embodiment, the monitoring of the method includes monitoring the UE-specific search space (USS) when the status indicates the UE is not engaged in the RACH procedure.

In one embodiment, an apparatus comprises a processor and an associated memory; the processor is configured to perform any of the methods above.

In one embodiment, an apparatus comprising a processor and an associated memory, wherein the processor is configured to determine a status of the apparatus with respect to the RACH procedure; and monitor either a common search space (CSS) or a UE-specific search based on the status. The apparatus may be a user equipment.

BRIEF DESCRIPTION OF THE DRAWINGS

The disclosed subject matter may be understood by reference to the following description taken in conjunction with the accompanying drawings, in which like reference numerals identify like elements, and in which:

FIG. 1a is a table illustrating Physical Downlink Control Channel (PDCCH) configured in Common Search Space (CSS) of Carrier Aggregation (CA) in accordance with the embodiments of the invention;

FIG. 1b is a table illustrating reduced PDCCH configured in CSS on SeNB in accordance with one or more embodiments described herein;

Figure 2:
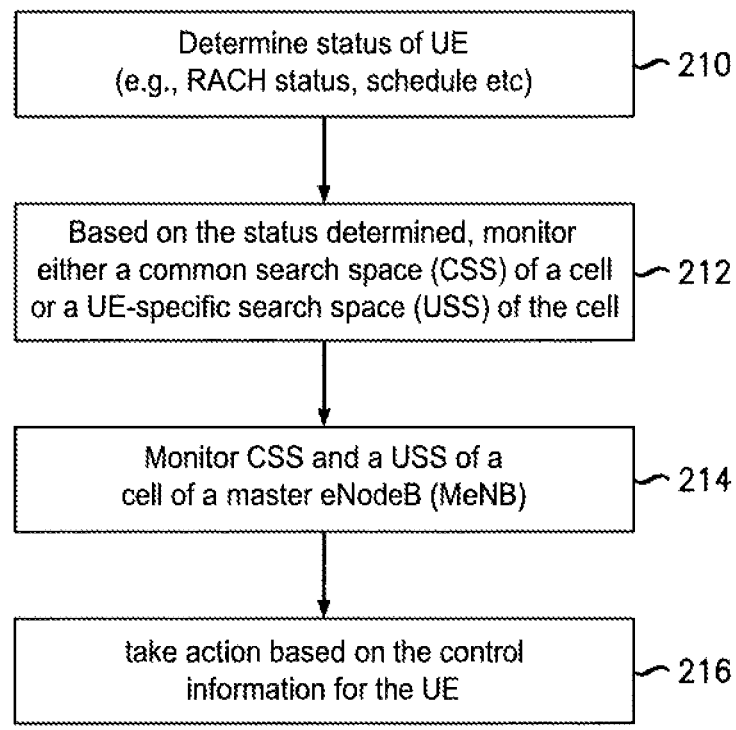
FIG. 2 is a flowchart illustrating an exemplary process for utilizing the CSS in accordance with the embodiments of the invention.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted or noted in the figures. For example, two steps described or two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "user terminal" may be considered synonymous to, and may hereafter be occasionally referred to, as a client, mobile, mobile terminal, mobile unit, mobile station, mobile user, user equipment (UE), subscriber, user, remote station, access agent, user agent, receiver, etc., and may describe a remote user of network resources in a communications network. Furthermore, the term "user terminal" may include any type of wireless/wired device such as consumer electronics devices, smart phones, tablet personal computers, personal digital assistants (PDAs), desktop computers, and laptop computers, for example.

As used herein, the term "network element", may be considered synonymous to and/or referred to as a networked computer, networking hardware, network equipment, router, switch, hub, bridge, gateway, base station or other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. The term "network element", may be considered synonymous to and/or referred to as a "base station". As used herein, the term "base station", may be considered synonymous to and/or referred to as an enhanced Node B (eNB), base transceiver station (BTS), NodeB, access point (AP), etc. and may describe equipment that provides the radio baseband functions for data and/or voice connectivity between a network and one or more users.

Example embodiments may be utilized in conjunction with RANs such as: $3^{rd}$ Generation Partnership Project LTE (3GPP LTE); and $4^{th}$ Generation LTE.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes (e.g., a base station). Such existing hardware may include one or more digital signal processors (DSPs), application-specific-integrated-circuits, field programmable gate arrays (FPGAs) computers or the like.

Dual connectivity is an operation where a given User Equipment (UE) consumes radio resources provided by at least two different network points (Master and Secondary eNBs) while in RRC_CONNECTED mode. The at least two different network point may be connected with non-ideal backhaul. The Master eNB (MeNB) terminates at least S1-MME (Mobility Management Entity) and therefore acts as mobility anchor towards the core network. The Secondary eNB (SeNB) provides additional radio resources for the UE.

According to 3GPP, when a given multiple Receive/Transmit (Rx/Tx) UE in RRC_CONNECTED is configured to utilize radio resources provided by two distinct schedulers (located on MeNB and SeNB), it is agreed that at least one cell in the SeNB has configured Uplink (UL) and one of them is configured with Physical Uplink Control Channel (PUCCH) resources; contention-based random access (RA) is supported for the SeNB; and the UE receives Message 2 (Msg2) of RA from the eNB to which the preamble was sent. Thus, to support these agreements for dual connectivity, it is necessary to configure dual common search spaces (CSSs) on MeNB and SeNB, respectively.

Carrier Aggregation (CA) in LTE-Advanced Rel10/11 has the following characteristics:
A single Radio Resource Control (RRC) connection is established with the Primary Cell (PCell), which controls all component carriers (CCs) configured for a UE;
The PCell of UE cannot be deactivated;
The UE only monitors the CSS of the PCell;
Use of semi-persistent scheduling (SPS) in Downlink (DL) or UL is limited to the PCell only;
The paging message is only transmitted from the PCell;
Contention Based Random Access is only performed on PCell;
Message 2 of Random Access is only transmitted from the PCell.

For UEs supporting legacy CA in Rel.10/11, only one CSS is configured on the PCell to transmit some essential DL control signaling. FIG. 1a is a table illustrating Physical Downlink Control Channel (PDCCH) configured in Common Search Space (CSS) of Carrier Aggregation (CA) in accordance with the embodiments of the invention. Illustrated in FIG. 1 are Downlink Control Information (DCI) and corresponding Radio Network Temporary Identifiers (RNTI). For example, as illustrated, DCI format 1C/1A may be paired with System Information RNTI (SI-RNTI) which is used for the transmission of System Information Block (SIB) messages, with Paging RNTI (P-RNTI) which is used for paging messages, or with Random Access RNTI (RA-RNTI) which is used for a PRACH response.

For example, DCI format 0/1A may be paired with Cell RNTI (C-RNTI) which is used for the transmission to a specific UE after RACH (Random Access Channel) or with Semi Persistent Scheduling C-RNTI (SPS C-RNTI). For example, DCI format 0 may be paired with Temporary C-RNTI which is mainly used during RACH. For example, DCI format 3/3A may be paired with Transmit Power Control-Physical Uplink Control Channel-RNTI (TPC-PUCCH-RNTI) or may be paired with Transmit Power Control-Physical Uplink Shared Channel-RNTI (TPC-PUSCH-RNTI).

However, for dual connectivity, some different characteristics from Carrier Aggregation (CA) have been agreed including Contention Based Random Access is supported for the SeNB in addition to the PCell on MeNB; and UE receives Message 2 of Random Access (RA) from the eNB to which the preamble was sent, i.e., Message 2 could be transmitted from MeNB or SeNB. Thus, the CA operations with only one CSS on PCell cannot support the dual connectivity characteristics.

In dual connectivity, the connection to the SeNB is generally established after the MeNB connection establishment. Moreover, the MeNB and the SeNB are connected via non-ideal backhaul.

One straightforward design for common search space on SeNB is to completely duplicate the common search space on MeNB from UE monitoring point of view. This design would increase the maximum number of blind decodings by twelve (12), and the UE would need to monitor all the possible DCI formats with the corresponding RNTIs (as listed in FIG. 1a) in all subframes.

Aiming at reducing the UE complexity, the different messages delivered on common search space are considered and a reduced CSS monitoring requirement for the UE proposed in the following.
RA-RNTI and Temporary RNTI (for RACH)

The RAN2 work group has agreed on RACH that, for PRACH, contention based RA is supported for SeNB and UE receives Message 2 of RA from the eNB to which the preamble was sent. Therefore, it is necessary to support Message 2 of RA (i.e., Random Access Response (RAR)) delivery from SeNB. DCI formats scrambled by RA-RNTI need to be delivered from SeNB, and the UE needs to monitor CSS for RA-RNTI scrambled RAR. Similarly, Msg 4 in RACH procedure would also need to be delivered from SeNB, so the UE would need to monitor for temporary RNTI scrambled Msg 4.
P-RNTI Related to paging, the RAN2 work group has agreed that MeNB terminates at least S1-MME and therefore acts as mobility anchor towards the core network and that the transmission of RRC messages via SeNB is not supported. This means that the paging messages would not be transmitted from SeNB.
SPS C-RNTI SPS in DL and UL is primarily targeted towards VoIP traffic and used for PDCCH overhead reduction. It is sensitive to delay, and thus it is reasonable to limit SPS to PCell in MeNB only. With this restriction, DCI formats scrambled by SPS C-RNTI do not need to be delivered from SeNB.

C-RNTI

Since the MeNB is always connected, SeNB does not have to support the fallback scheduling (e.g., during reconfiguration period). This can be carried on MeNB only. In this case, DCI formats scrambled by C-RNTI are not delivered in CSS on SeNB.

SI-RNTI

There are two alternatives for delivering system information of the SeNB to the UE. In a first alternative, the UE is required to monitor SI-RNTI on the SeNB so it would always receive up-to-date information. However, the UE would only be able to monitor SI-RNTI on one cell in the SeNB (the one that UE monitors CSS on). For all the other cells, there needs to be another way to deliver System Information (SI). In a second alternative, the SI of all the cells in the SeNB is always sent using UE-specific signaling, which follows the principle of Carrier Aggregation (CA) today. Given that for the first alternative other solutions are needed for other cells in SeNB anyway, it may be preferable to simply follow CA principle and use the second alternative. By doing so, the UE does not need to monitor the DCI formats scrambled by SI-RNTI.

TPC-PUCCH-RNTI and TPC-PUSCH-RNTI

One motivation for introducing Format 3/3A was for SPS, when the eNB may not have enough opportunity to deliver Transmit Power Control (TPC) in DL/UL grants. If SPS is not supported on SeNB, we need to consider further if the support of TPC-PUCCH-RNTI and TPC-PUSCH-RNTI would be necessary. For example, in one embodiment, TPC-PUCCH-RNTI and TPC-PUSCH-RNTI may not be supported such that UE does not need to monitor the DCI formats scrambled these RNTI.

Based on the above discussions, the design of CSS on SeNB may be simplified in one embodiment as illustrated in FIG. 1b. This embodiment basically supports the minimum functionality, which is contention-based RACH procedure, and possibly group TPC commands. FIG. 1b is a table illustrating reduced PDCCH configured in CSS on SeNB in accordance with one example embodiment. The brackets in the bottom two rows of the figure indicate their optionality.

For the example simplified design of CSS on SeNB, the capacity of CSS on SeNB is saved. In particular, if DCI formats 3/3A are not monitored, the occasions when the UE has to monitor the CSS on the SeNB become very limited: when the UE is monitoring for DCI scrambled with RA-RNTI and temporary C-RNTI, it cannot receive any DCI on the USS. Therefore, in this way, it is possible to avoid increasing the peak number of blind decodes at all, since in any given subframe the UE either performs twelve (12) blind decodes on the CSS or thirty-two (32) blind decodes on the USS, but never both at the same time.

Accordingly, based on the agreements within 3GPP on dual connectivity, it is proposed herein that it is not necessary for a UE to monitor much of the usual CSS DCI. The DCI in the CSS on the SeNB can be reduced to DCI format 1C/1A scrambled with the RA-RNTI, and DCI format 0 scrambled with the Temporary C-RNTI. In this case, the UE will never have to monitor CSS and USS on SeNB at the same time, and therefore the total peak number of blind decodes is not increased by dual connectivity.

FIG. 2 is a flowchart illustrating an exemplary process for utilizing the CSS in accordance with embodiments described herein. Control signaling is necessary to support downlink and uplink transport channels. In Long Term Evolution (LTE) systems, Downlink Shared Channel (DL-SCH) and Uplink Shared Channel (UL-SCH) control signaling is utilized to support transport channels. The control signaling enables User Equipment (UE) to successfully receive, demodulate, and decode the DL-SCH. Downlink Control Information (DCI) is transmitted through a Physical Downlink Control Channel (PDCCH) and an Enhanced Physical Downlink Control Channel (EPDCCH). DCI includes information about the DL-SCH resource allocation (the set of physical resource blocks (PRBs) containing the DL-SCH), transport format and information related to the DL-SCH Hybrid Automatic Repeat reQuest (ARQ). A PRB includes a number of subcarriers by a number of symbols. In LTE, a PRB is twelve (12) subcarriers by seven (7) OFDM symbols, which is eighty-four (84) modulation symbols.

The DCI undergoes channel coding, the addition of a Cyclic Redundancy Check (CRC) attachment followed by convolutional coding and rate matching according to PDCCH format capacity, in order to form the PDCCH payload. The coded DCI bits (i.e., PDCCH payload) are then mapped to Control Channel Elements (CCEs) according to the PDCCH format. These coded bits are then converted to complex modulated symbols after performing operations including scrambling, Quadrature Phase Shift Keying (QPSK) modulation, layer mapping and precoding. Finally, the modulated symbols are mapped to physical Resource Elements (REs).

After performing deprecoding, symbol combining, symbol demodulation and descrambling at the receiver, the UE is required to perform blind decoding of the PDCCH payload as it is not aware of the detailed control channel structure, including the number of control channels and the number of CCEs to which each control channel is mapped. Multiple PDCCHs can be transmitted in a single subframe. All of these multiple PDCCHs may and may not be all relevant to a particular UE. The UE finds the PDCCH specific to it by monitoring a set of PDCCH candidates (e.g., a set of consecutive CCEs on which a PDCCH could be mapped) in every subframe. The UE uses its Radio Network Temporary Identifier (RNTI) to try and decode candidates. The RNTI is used to demask a PDCCH candidate's CRC. If no CRC error is detected, the UE determines that PDCCH carries control information for the UE.

The example flowchart of illustrates a method 200 for receiving, at a receiving device, a control information message from a transmitting device.

At operation 210, a status of the UE is determined. In one embodiment, the status may be a status of the UE with respect to a Random Access Channel (RACH) procedure with the cell. In one embodiment, the status may indicates a time within a first set of subframes received by the UE or within a second set of subframes received by the UE. In one embodiment, the status is indicative of a time at the UE within a CSS search time or a USS search time according to a time-sharing monitoring schedule.

At operation 212, based on the status determined, either a common search space (CSS) of a cell or a UE-specific search space (USS) of the cell is monitored. The cell monitored in operation 212 is a cell of a secondary eNodeB for communicating with the UE. The common search space (CSS) may be monitored during the during the Random Access Channel (RACH) procedure. The common search space (CSS) may be monitored when the status indicates the UE is engaged in the Random Access Channel (RACH) procedure. In one embodiment, the CSS may be monitored for at least one of the group consisting of Downlink Control Information (DCI) format 1A/1C scrambled by Random Access-Radio Network Temporary Identifier (RA-RNTI) and DCI format 0 scrambled by Temporary Cell-RNTI (C-RNTI).

In one embodiment, the CSS may be monitored for only DCI format 1A/1C scrambled by RA-RNTI and DCI format 0 scrambled by Temporary C-RNTI; optional, the CSS may also be monitored for DCI format 3/3A scrambled by Transmit-Power-Control Physical-Uplink-Control-Channel RNTI (TPC-PUCCH-RNTI) and TPC-Physical Uplink Shared Channel-RNTI (TPC-PUSCH-RNTI in this embodiment.

The UE-specific search space (USS) may be monitored when the status indicates the UE is not engaged in the Random Access Channel (RACH) procedure.

At operation 214, a CSS and a USS of a cell of a master eNodeB (MeNB) are monitored. The monitoring of operation 214 may occur simultaneously with monitoring of operation 212.

At operation 216, action is taken based on the control information for the UE.

Figure 3:
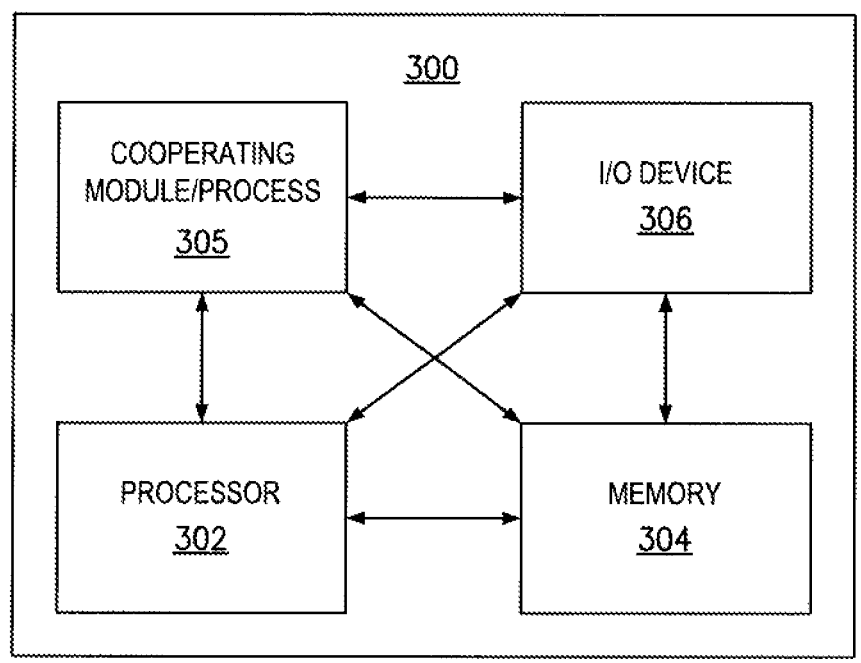
FIG. 3 depicts a high-level block diagram of a computer suitable for use in performing functions described herein.

FIG. 3 depicts a high-level block diagram of a computer suitable for use in performing the operations and methodology described herein. The computer 300 includes a processor 302 (e.g., a central processing unit (CPU) or other suitable processor(s)) and a memory 304 (e.g., random access memory (RAM), read only memory (ROM), and the like).

The computer 300 also may include a cooperating module/process 305. The cooperating process 305 can be loaded into memory 304 and executed by the processor 302 to implement functions as discussed herein and, thus, cooperating process 305 (including associated data structures) can be stored on a computer readable storage medium, e.g., RAM memory, magnetic or optical drive or diskette, and the like.

The computer 300 also may include one or more input/output devices 306 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 300 depicted in FIG. 3 provides a general architecture and functionality suitable for implementing functional elements described herein or portions of functional elements described herein. For example, the computer 300 provides a general architecture and functionality suitable for implementing one or more of a UE, a eNB, MeNB, SeNB, network element, and the like.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of one or more of the methods described herein. The program storage devices may be non-transitory media, e.g., digital memories, magnetic storage media such as a magnetic disks or tapes, hard drives, or optically readable digital data storage media. In one or more embodiments, tangible medium excluding signals may include a set of instructions which when executed are operable to perform one or more of the descried methods. The provided embodiments are also intended to be embodied in computers programmed to perform said steps of methods described herein.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms 'a' or 'an', as used herein, are defined as one or more than one. The term "plurality", as used herein, is defined as two or more than two. The term "another", as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Aspects of various embodiments are specified in the claims. Those and other aspects of various embodiments are specified in the following numbered paragraphs:

1. A method comprising
   determining at a user equipment (UE) a status of the UE; and
   monitoring at the UE based on the status either a common search space (CSS) of a cell or a UE-specific search space (USS) of the cell.

2. The method of claim 1 wherein the cell is a cell of a secondary eNodeB for communicating with the UE.

3. The method of claim 1 or 2 wherein the monitoring at the UE based on the status either the CSS of the cell or the USS of the cell monitors a cell of a secondary eNodeB, the method further comprising
   monitoring a CSS and a USS of a cell of a master eNodeB simultaneously while monitoring either the CSS or the USS of the cell of the secondary eNodeB.

4. The method of claim 1, 2, or 3 wherein the status is a status of the UE with respect to a RACH procedure with the cell, and wherein the cell is a cell of a secondary eNodeB.

5. The method of claim 1, 2, 3 or 4 wherein the status indicates a time within a first set of subframes received by the UE or within a second set of subframes received by the UE.

6. A method comprising
monitoring at a UE either a common search space (CSS) of cell or a UE-specific search space (USS) of the cell on a time-sharing basis.

7. A method comprising:
determining at a user equipment (UE) a status of the UE with respect to a RACH procedure with a cell of a secondary eNodeb; and
monitoring at the UE based on the status either a common search space (CSS) of the cell or a UE-specific search space (USS) of the cell.

8. A method comprising:
determining at a user equipment (UE) a status of the UE with respect to a RACH procedure;
monitoring at the UE only one of a common search space (CSS) of the cell or a UE-specific search space (USS) of the cell based on the status.

9. The method of claim 7 or 8 wherein monitoring comprises:
monitoring the common search space (CSS) during the RACH procedure.

10. The method of claim 7, 8 or 9 wherein monitoring comprises:
monitoring the common search space (CSS) when the status indicates the UE is engaged in the RACH procedure.

11. The method of claim 7, 8, 9 or 10 wherein monitoring comprises:
monitoring the CSS for at least one of DCI format 1A/1C scrambled by RA-RNTI and DCI format 0 scrambled by temporary C-RNTI.

12. The method of claim 7, 8, 9, 10 or 11 wherein monitoring comprises:
monitoring the CSS for only DCI format 1A/1C scrambled by RA-RNTI and DCI format 0 scrambled by temporary C-RNTI.

13. The method of claim 1 wherein monitoring comprises:
monitoring the UE-specific search space (USS) when the status indicates the UE is not engaged in the RACH procedure.

14. An apparatus comprising a processor and an associated memory, wherein the processor is configured to perform any of the methods above.

15. An apparatus comprising a processor and an associated memory, wherein the processor is configured to
determine a status of the apparatus with respect to the RACH procedure;
monitor either a common search space (CSS) or a UE-specific search based on the status.

16. The apparatus of any apparatus claim above wherein the apparatus is a user equipment.

The invention claimed is:

1. A method comprising:
determining at a user equipment (UE) a status of the UE;
monitoring at the UE based on the status either a common search space (CSS) of a cell or a UE-specific search space (USS) of the cell, wherein the monitoring at the UE comprises monitoring a cell of a secondary eNodeB (SeNB); and
monitoring a CSS and a USS of a cell of a master eNodeB (MeNB) simultaneously while monitoring either the CSS or the USS of the cell of the secondary eNodeB.

2. A method comprising:
determining at a user equipment (UE) a status of the UE;
monitoring at the UE based on the status either a common search space (CSS) of a cell or a UE-specific search space (USS) of the cell, wherein the status is a status of the UE with respect to a Random Access Channel (RACH) procedure with the cell, and wherein the cell is a cell of a secondary eNodeB (SeNB).

3. A method comprising:
determining at a user equipment (UE) a status of the UE with respect to a Random Access Channel (RACH) procedure;
monitoring at the UE one of a common search space (CSS) of a cell or a UE-specific search space (USS) of the cell, based on the status.

4. The method of claim 3 wherein the monitoring comprises:
monitoring the common search space (CSS) during the Random Access Channel (RACH) procedure.

5. The method of claim 3 wherein monitoring comprises:
monitoring the common search space (CSS) when the status indicates the UE is engaged in the Random Access Channel (RACH) procedure.

6. The method of claim 3 wherein the monitoring comprises:
monitoring the CSS for at least one of the group consisting of Downlink Control Information (DCI) format 1A/1C scrambled by Random Access-Radio Network Temporary Identifier (RA-RNTI) and DCI format 0 scrambled by Temporary Cell-RNTI (C-RNTI).

7. The method of claim 3 wherein the monitoring comprises:
monitoring the CSS for only Downlink Control Information (DCI) format 1A/1C scrambled by Random Access-Radio Network Temporary Identifier (RA-RNTI) and DCI format 0 scrambled by Temporary Cell-RNTI (C-RNTI).

8. The method of claim 3 wherein the monitoring comprises:
monitoring the UE-specific search space (USS) when the status indicates the UE is not engaged in the Random Access Channel (RACH) procedure.

9. An apparatus comprising a processor and an associated memory, wherein the processor is configured to:
determine a status of the apparatus; and
monitor based on the status either a common search space (CSS) of a cell or a UE-specific search space (USS) of the cell, wherein the processor is configured to monitor a CSS and a USS of a cell of a master eNodeB simultaneously with monitoring either the CSS or the USS of the cell of the secondary eNodeB.

10. An apparatus comprising a processor and an associated memory, wherein the processor is configured to:
determine a status of the apparatus; and
monitor based on the status either a common search space (CSS) of a cell or a UE-specific search space (USS) of the cell, wherein the status is a status of the apparatus with respect to a Random Access Channel (RACH) procedure.

* * * * *